June 18, 1957  H. D. HUME  2,795,922
FLOATING CUTTER BAR FOR HARVESTERS
Filed July 27, 1953  4 Sheets-Sheet 1
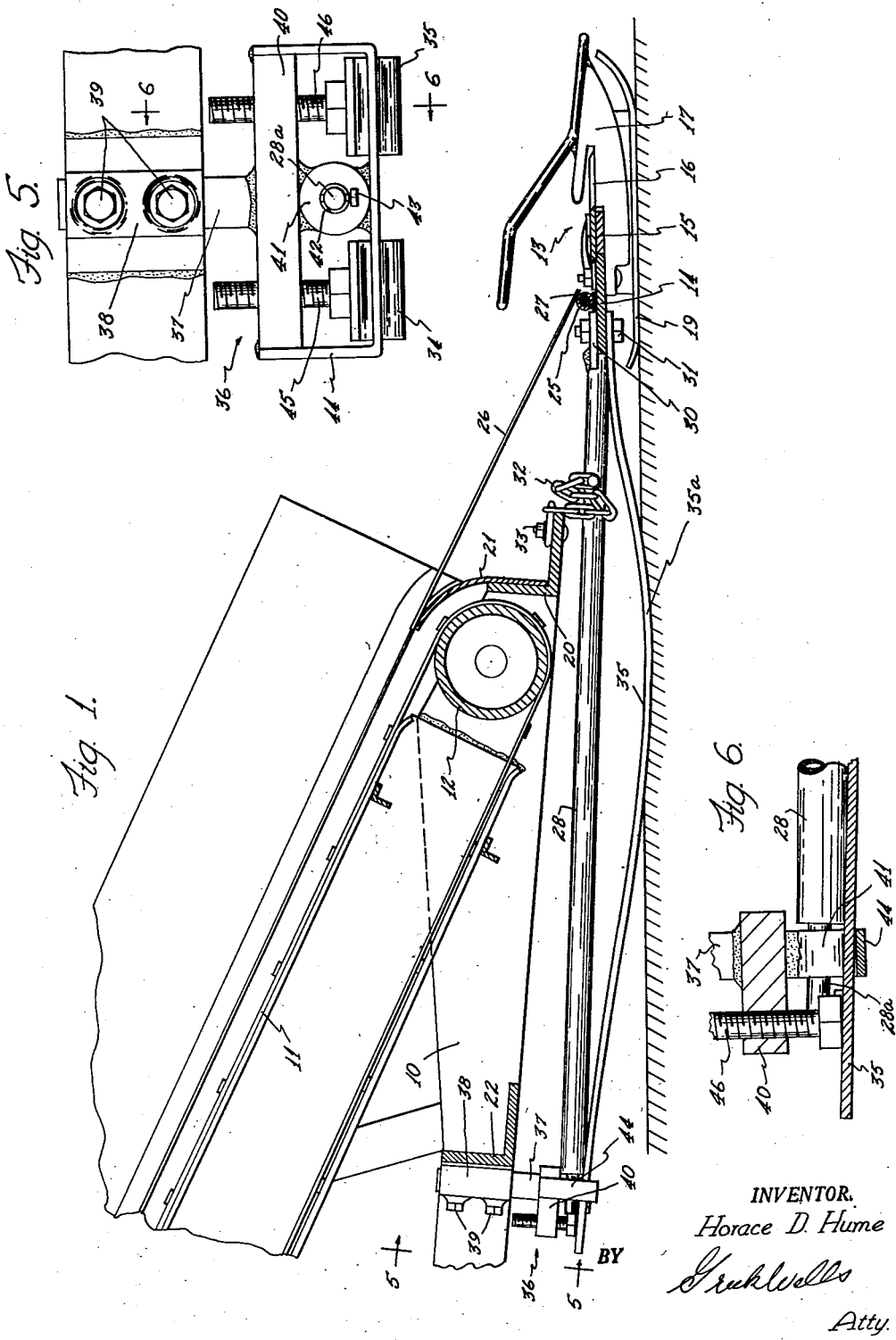
INVENTOR.
Horace D. Hume
BY
Atty.

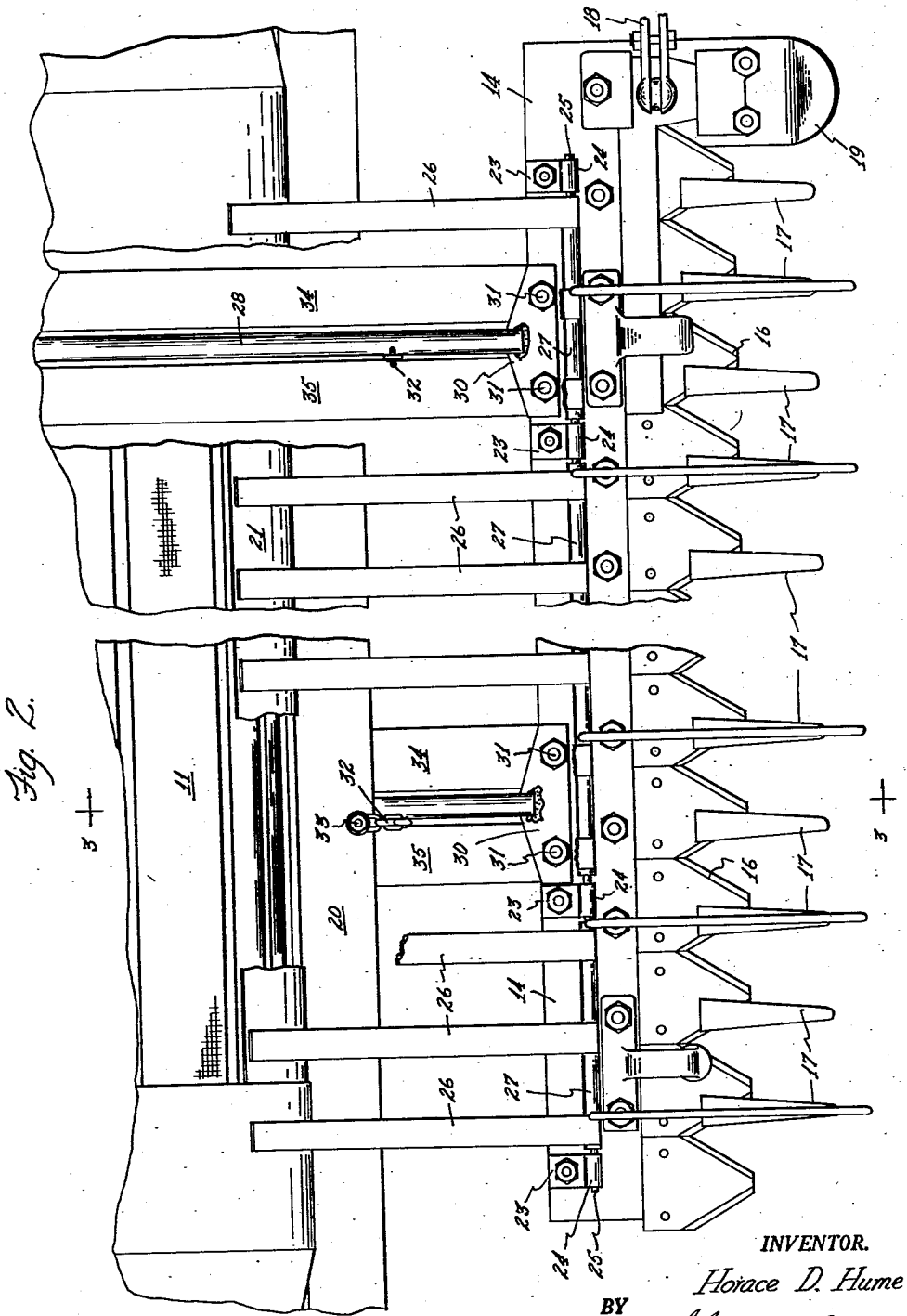

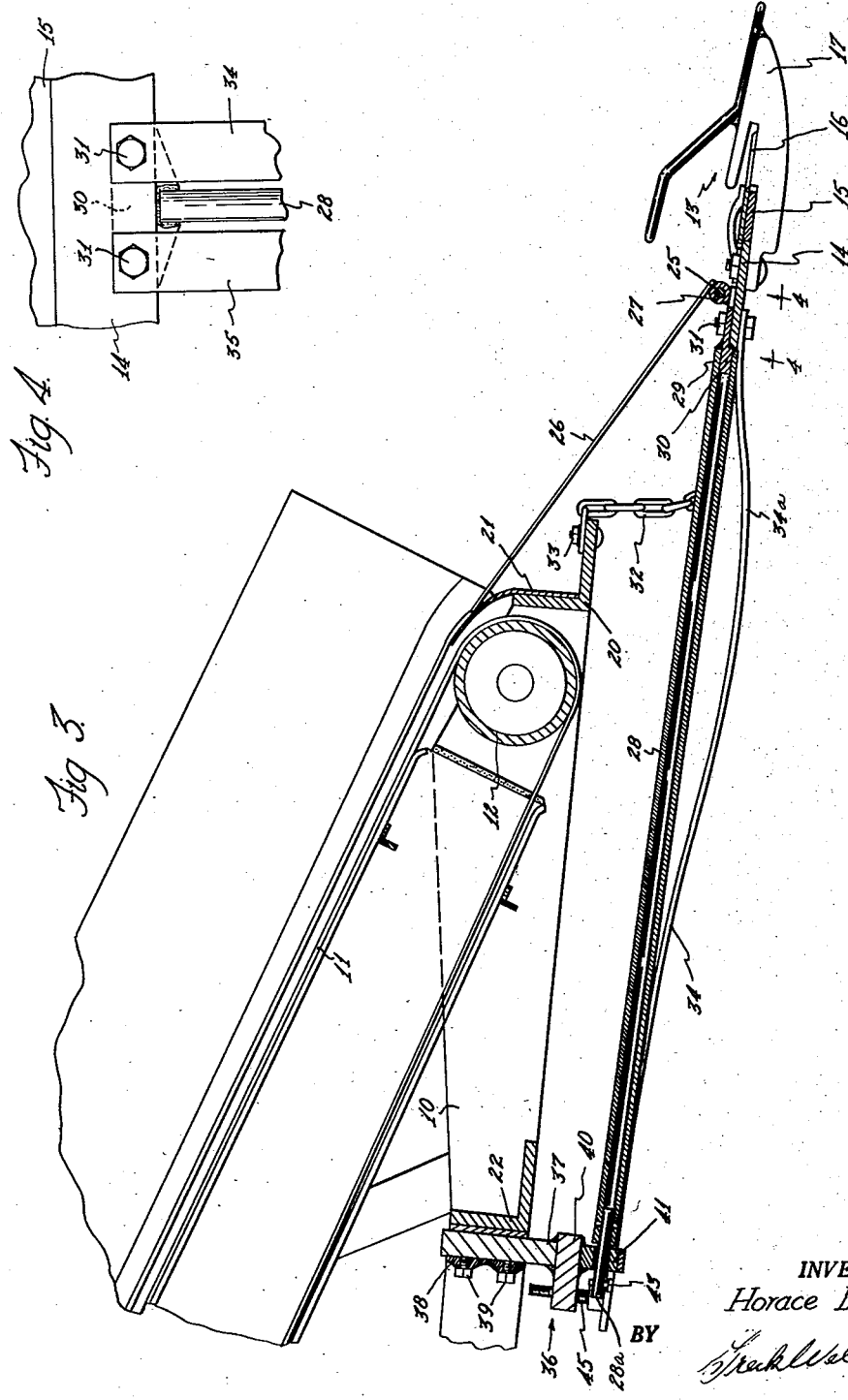

June 18, 1957  H. D. HUME  2,795,922
FLOATING CUTTER BAR FOR HARVESTERS
Filed July 27, 1953  4 Sheets-Sheet 4

INVENTOR.
Horace D. Hume
BY
Atty.

United States Patent Office 2,795,922
Patented June 18, 1957

2,795,922

FLOATING CUTTER BAR FOR HARVESTERS

Horace D. Hume, Mendota, Ill.

Application July 27, 1953, Serial No. 370,260

4 Claims. (Cl. 56—257)

My invention relates to improvement in a floating cutter bar for harvesters. In the prior Patent No. 1,996,294, dated April 2, 1935, to James E. Love and me, there is shown a cutter bar and supporting mechanism for the cutter bar wherein the cutter bar is mounted for limited movement up and down with respect to the harvester frame, and leaf springs are provided between the frame and cutter bar supporting shoes that extend rearwardly from the cutting bar. It is the purpose of the present invention to provide an improvement over the construction shown in this patent whereby the spring suspension of the cutter bar is simplified and the transfer of the cut crop from the cutter bar onto the draper or other conveying means on the frame is improved.

The nature and advantages of my invention will appear more fully from the following description and the accompanying drawings wherein a preferred form of the invention is disclosed.

In the drawings:

Figure 1 is a sectional view taken on a vertical plane and transverse to the cutter bar, showing my invention as applied to a harvester of the character illustrated in the patent mentioned above;

Figure 2 is a plan view with parts broken away, looking down on the structure shown in Figure 1;

Figure 3 is a sectional view taken on the line 3—3 of Figure 2;

Figure 4 is a fragmentary bottom plan view looking up at Figure 3 in the direction indicated by the section lines 4—4 of Figure 3;

Figure 5 is an enlarged end view looking at Figure 1 in the direction indicated by the section lines 5—5;

Figure 6 is a sectional view taken on the line 6—6 of Figure 5;

Figure 7:
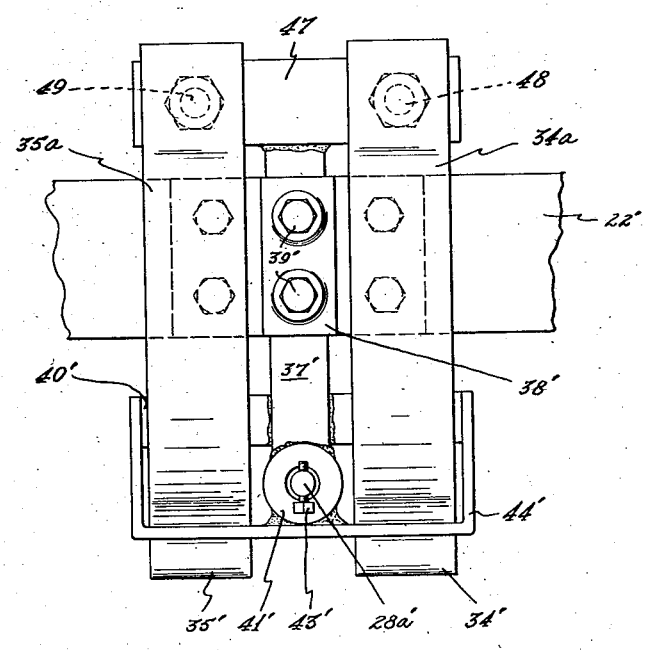
Figure 7 is a rear end view of a modified construction.

Referring now to the drawings and in particular to Figures 1 and 2, my invention is illustrated in connection with a harvester which has a main frame 10 supported in the usual manner. This frame carries a draper 11 which travels around a draper roller 12 which is spaced rearwardly of the cutting mechanism 13. The cutting mechanism 13 comprises a cutter bar 14, a sickle 15 supported on the cutter bar for reciprocation and having cutting sections 16 thereon. The cutter bar carries sickle guards 17 that cooperate with the sections 16 in cutting the crop. The sickle 15 is reciprocated by a pitman rod 18 in the usual fashion. The cutter bar has one or more shoes 19 that are adapted to engage the ground and limit the downward movement of the cutter bar.

The frame 10 includes a front cross piece 20 which carries a curved shield 21 that extends up over the front draper roller 12. The frame 10 has a second bar 22 spaced rearwardly from the front bar 20 for supporting the cutting mechanism 13 for swinging movement up and down with respect to the front end of the frame 10. It will be appreciated that in cutting crops, the cutting mechanism 13 should be permitted to follow the contour of the ground as closely as possible at the point where the cutting is taking place. The support wheels for the vehicle that carries the harvester are usually spaced to the rear of the cutting mechanism so that they are not necessarily on the same level of ground contour as the cutter mechanism. The suspension of the cutting mechanism so that it could follow the ground contour and still receive the forward force necessary to push it, was illustrated in the prior patent above referred to. According to my invention I provide an improved means for suspending the cutter mechanism and guiding the cut crop from the cutter mechanism to the draper as it is cut. The cutter bar 14 carries a plurality of bearing plates 23, having tubular supports 24 for a hinge pin 25. Crop guide fingers 26 are secured in groups of three on tubes 27 between the spaced plates 23. The tubes 27, the supports 24 and the hinge pin 25 form hinges so that the fingers 26 can rest on the shield 21 in all positions of the cutter bar 14 as it moves up and down with respect to the frame 10.

The support for the cutter bar comprises a push rod 28 which is split at its front end as indicated at 29 in Figure 3, and welded to a bracket 30 that is bolted onto the cutter bar 14 by bolts 31. There are two of the push rods 28 spaced apart lengthwise of the cutter bar as illustrated in Figure 2. A flexible suspension member 32 is secured to each of the push rods 28 and is fastened to the cross frame member 20 by a bolt 33. This flexible suspension member shown as a chain, limits the downward movement of the push rods 28 with respect to the cross bar 20 so that when it is desired to lift the cutter bar clear of the ground for roadway transportation, or moving from one field to another, this can be accomplished by lifting the frame 10 in the usual manner. The plate 30 also serves to mount the front ends of two leaf springs 34 and 35 which serve as the resilient suspension means for the cutter mechanism. There are two sets of springs 34 and 35 shown in the mechanism illustrated. It will be appreciated that more pusher bars 28 and leaf springs may be used where the length of the cutter bar warrants it.

The push rod 28 and the leaf springs 34 and 35 are supported from the cross bar 22 by the mechanism illustrated best in Figures 1, 3, 5 and 6 of the drawings. A supporting bracket 36 has a square stem 37 which extends up through a guide block 38 on the cross bar 22. The stem 37 is vertically adjustable in the block 38 and is held in adjusted position by set screws 39. The bracket 36 includes a main cross bar 40 to which the stem 37 is welded. This cross bar 40 has a support 41 welded to its lower face. The support 41 is apertured at 42 to receive a reduced extension 28a of the push rod 28 and forms an end thrust bearing for the push rod. As shown by Figure 3, the aperture 42 loosely receives the reduced extension 28a so that the push rod can have limited movement with respect to the support 41 in an up and down direction. The forward force necessary to push the cutting mechanism 13 is transmitted through the push rod 28 to the support 41 by engagement of the rear end of the push rod with this support. The reduced extension 28a has a stop member 43 thereon to prevent the reduced extension from coming out of the aperture 42 when the machine is backed up.

The rear ends of the springs 34 and 35 are mounted in the bracket 36 so that the lifting force exerted by the springs 34 and 35 on the cutter bar 14 can be adjusted to carry most of the weight of the cutter bar in order to prevent it from sinking into soft ground. The bracket 36 is provided with a strap 44 so that it serves as a supporting member for the rear ends of the springs. The strap 44 is connected to the ends of the bar 40 and extends downwardly and then transversely between the ends of the bar 40. The support 41 is welded to the strap 44 to provide a center support. The springs 34 and 35 rest on the strap 44. The bar 40 extends rearwardly of the strap 44 and is threaded to receive two spring tensioning members comprising bolts 45 and 46 which have their heads bearing on the rear ends of the springs 34 and 35. By adjusting the bolts 45 and 46 downward, the springs 34 and 35 can be made to exert more lift on the cutter bar 14.

It is a distinct advantage of the present invention that the springs 34 and 35 are bowed down intermediate their ends as indicated at 34a and 35a to act as ground engaging shoes in the normal movement of the cuter bar 14 forward in cutting operation. The ground engagement gives a yielding support for the cutter bar when the springs are on the ground and in addition, relieves the rear ends of the springs from the load of the cutter bar. The springs 34 and 35 are secured to the cutter bar by the bolts 31 and are easily replaced in the event they become damaged or worn. By combining the spring supports 34 and 35 with the push rod 28 and the pivoted fingers 26, I have provided a floating cutting bar assembly for harvesters in which the parts are particularly free of strain in operation in the field. The forward thrust necessary to move the cutter bar is carried entirely by the push rod 28. The principal load of the cutter bar is borne by the spring 34 and 35 and they are relieved of stress by their engagement with the ground as shoes. The fingers 26, being free to turn on the cutter bar, are not lifted up and down with respect to the draper 11 in the vertical movements of the cutter bar, but ride at all times directly on the shield 21 so that they are supported at both ends. In transportation of the harvester when the cutter mechanism has to be completely lifted from the ground, the chains 32 provide a positive support to avoid excessive strain on the springs 34 and 35.

Figure 8:
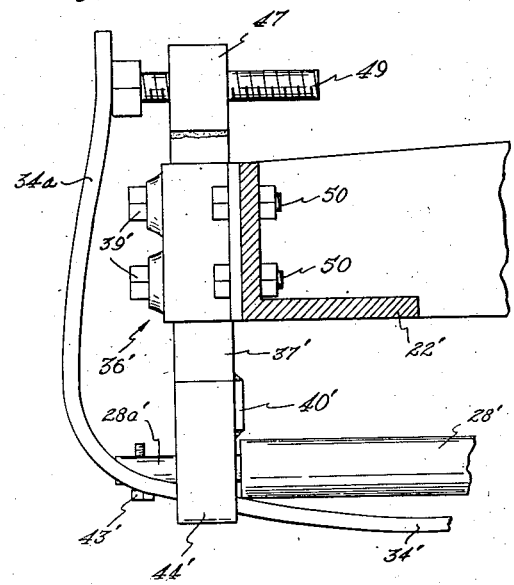
Figure 8 is a side view of the construction shown in Figure 7.

The form of construction shown in Figures 7 and 8 works in essentially the same manner as that shown in Figures 1 to 6. In this modification, however, the leaf springs 34' and 35' have upwardly extended portions 34a and 35a that provide longer lever arms and a more sensitive adjustment of the tension of the leaf springs than the form of tension adjustment in Figures 1 to 6. The stem 37' is provided with a cross bar 47 above the cross frame bar 22'. This cross bar carries two spring tensioning members 48 and 49 to engage the upper ends of the portions 34a and 35a. The guide block 38' is bolted to the bar 22' by bolts 50 so that the entire bracket 36' can be removed.

It is believed that the nature and advantages of my invention will be clear from the foregoing description. The description and drawings illustrate the preferred form of the invention in detail, however, various minor modifications obviously can be made within the scope of the invention as set forth hereinafter in the claims.

Having thus described my invention, I claim:

1. In a harvesting machine, the combination with a supporting frame and a cutting mechanism, of crop guide fingers pivoted on the cutting mechanism and resting on the frame, a push rod attached to the cutting mechanism and located beneath the frame, a support on the frame at the rear end of the rod loosely suspending the rod from the frame and providing an end thrust bearing therefor, leaf spring shoes supporting the cutting mechanism and extending rearwardly to the support, a transverse strap beneath each spring and suspended from the support, and spring tensioning members on the support pressing on the springs rearwardly of the transverse straps.

2. In a harvesting machine, the combination with a supporting frame and a cutting mechanism, of a push rod attached to the cutting mechanism and located beneath the frame, a support on the frame for the rod loosely suspending the rod from the frame and providing an end thrust bearing therefor, leaf spring shoes supporting the cutting mechanism and extending rearwardly to the support, a transverse strap beneath each spring and suspended from the support, and spring tensioning members on the support pressing on the springs rearwardly of the transverse straps.

3. In a harvesting machine, having a vehicle carried supporting frame and a cutter bar, means resiliently mounting the cutter bar on the frame for yielding up and down movement to follow the ground contour, said means comprising two spaced apart pusher rods having their front ends affixed to the cutter bar and extending rearwardly therefrom, rod supports affixed to said supporting frame at the rear ends of the rods, the rods being movably mounted to said supports so they may rock up and down, end thrust bearings on the supports for transmitting force endwise of the rods from the frame to the cutter bar, leaf spring shoes alongside the rods and affixed to the cutter bar at their front ends, said shoes being curved downwardly immediately back of the cutter bar and then extending upwardly and rearwardly beside the rods, spring shoe supporting members carried by the frame adjacent to the rear ends of the shoes, the rear end of each shoe extending over a portion of its supporting member and rearwardly thereof, and screws on said supporting members for forcing the rear ends of the shoes downward.

4. In a harvesting machine, having a vehicle carried supporting frame and a cutter bar, means resiliently mounting the cutter bar on the frame for yielding up and down movement to follow the ground contour, said means comprising two spaced apart pusher rods having their front ends affixed to the cutter bar and extending rearwardly therefrom, brackets suspended from the frame at the rear ends of said rods, apertured rod supports in the brackets, the rods having reduced portions extending through the apertured supports, and fitting loosely therein, leaf spring shoes alongside the rods and affixed to the cutter bar, said shoes curving downwardly immediately back of the cutter bar to engage the ground below the cutter bar level and behind the cutter bar, and then extending rearwardly alongside the rods to said brackets, the brackets having support straps for the spring shoes, and screws threaded therein pressing upon the spring shoes rearwardly of the straps.

References Cited in the file of this patent

UNITED STATES PATENTS

| | | |
|---|---|---|
| Re. 21,064 | Hume et al. | Oct. 22, 1940 |
| 1,881,411 | Love et al. | Oct. 4, 1932 |
| 1,996,294 | Hume et al. | Apr. 2, 1935 |
| 2,099,471 | Edgington | Nov. 16, 1937 |
| 2,298,121 | Grimes | Oct. 6, 1942 |
| 2,375,848 | Hume | May 15, 1945 |
| 2,505,089 | Bailey et al. | Apr. 25, 1950 |